United States Patent [19]

Aggen

[11] 4,010,778
[45] Mar. 8, 1977

[54] AUTOMATIC SEED PLANTING MACHINE AND METHOD FOR PLANTING SEEDS IN PLANTERS

[76] Inventor: Alvin F. Aggen, 2750 Sailor Ave., Ventura, Calif. 93003

[22] Filed: Jan. 10, 1973

[21] Appl. No.: 322,391

[52] U.S. Cl. .................................... 141/9; 47/1 R; 53/36; 111/1
[51] Int. Cl.² ......................................... B65B 3/04
[58] Field of Search ............. 47/1; 53/36, 160, 178, 53/180, 239; 111/1; 141/1, 9, 35, 36, 100, 103, 125, 131, 132, 163, 168, 177, 178, 256, 280, 324, 367; 198/34, 76, 184

[56] References Cited

UNITED STATES PATENTS

| | | | |
|---|---|---|---|
| 1,175,190 | 3/1916 | Stuart | 198/76 |
| 2,030,541 | 2/1936 | Rose | 141/131 X |
| 2,548,222 | 4/1951 | Kindseth | 141/103 X |
| 2,623,676 | 12/1952 | Baker et al. | 141/131 |
| 2,990,873 | 7/1961 | Fahrni | 141/1 |
| 3,376,849 | 4/1968 | Squier | 141/131 X |

*Primary Examiner*—Richard E. Aegerter
*Assistant Examiner*—Frederick R. Schmidt
*Attorney, Agent, or Firm*—Fulwider Patton Rieber Lee & Utecht

[57] ABSTRACT

A method and automatic machine for planting seeds in boxes which insures that uniform and consistent seed distribution will be present in each planted box, and comprising dispensing seeds continuously from a supply hopper in single height, side-by-side relation onto an upper endless conveyor, dropping the seeds from the upper conveyor onto a lower endless conveyor moving at a speed greater than the upper conveyor, and depositing the seeds on the lower conveyor into boxes moving on a delivery conveyor below the lower conveyor. After the seeds have been deposited in the boxes, the boxes move under a second hopper where a covering material is dispensed uniformly over the seeds. Adjustable gates on the supply hopper and the second hopper control the discharge of seeds and covering material, respectively, to insure uniform and consistent discharge from the hoppers.

3 Claims, 3 Drawing Figures

AUTOMATIC SEED PLANTING MACHINE AND METHOD FOR PLANTING SEEDS IN PLANTERS

BACKGROUND OF THE INVENTION

This invention relates to the planting of seeds in shallow boxes, and has particular reference to a method and machine for automatically distributing seeds uniformly into such boxes.

On typical seedling nursery farms, shallow boxes called "flats" are partially filled with dirt and numerous fruit or vegetable seeds are then distributed into the flats and covered with sand, fine gravel, soil, or the like. The planted flats are then placed in a greenhouse until the seeds germinate and develop into groups of seedlings which are then separated from the flats into individual seedlings for subsequent planting in fields.

The most critical step in growing seedlings is achieving uniform distribution of the seeds in the flats. Unless the seeds have been properly distributed, many seedlings may fail to develop while others will over-develop. Prior to the present invention, seeds were typically planted manually, usually by dispensing the seeds from a perforated hand-held shaker-type container, with the result that consistent and uniform seed distribution was almost impossible.

SUMMARY OF THE INVENTION

The present invention provides a method and automatic machine for planting fruit or vegetable seeds of preselected thicknesses in flats on a continuous basis and in a manner that will insure a uniform and consistent seed distribution and covering in each planted flat.

More specifically, seeds are continuously and uniformly distributed into flats moving on a delivery conveyor by initially dispensing a layer of seeds of predetermined thicknesses uniformly in side-by-side, closely spaced rows from a supply hopper onto an upper conveyor which delivers the seeds to a lower conveyor moving at a speed equal to that of the delivery conveyor and faster than the speed of the upper conveyor, thereby spreading the seeds apart while maintaining their uniformity of distribution. The lower conveyor dispenses its seeds into the flats which then pass under a second hopper where a covering material is applied over the seeds to complete the planting operation.

Seeds are dispensed from the supply hopper which has an adjustable gate to control seed distribution on the upper conveyor by permitting only one layer of seeds to be discharged from the hopper at a time. Through proper adjustment of the gate, the size of the seeds dispensed from the supply hopper also can be controlled to prevent the planting of large, wet seeds which may not germinate.

Other aspects and advantages of the invention will become apparent from the following detailed description taken in conjunction with the drawings which disclose, by way of example, the principles of the invention.

DETAILED DESCRIPTION

Figure 1:
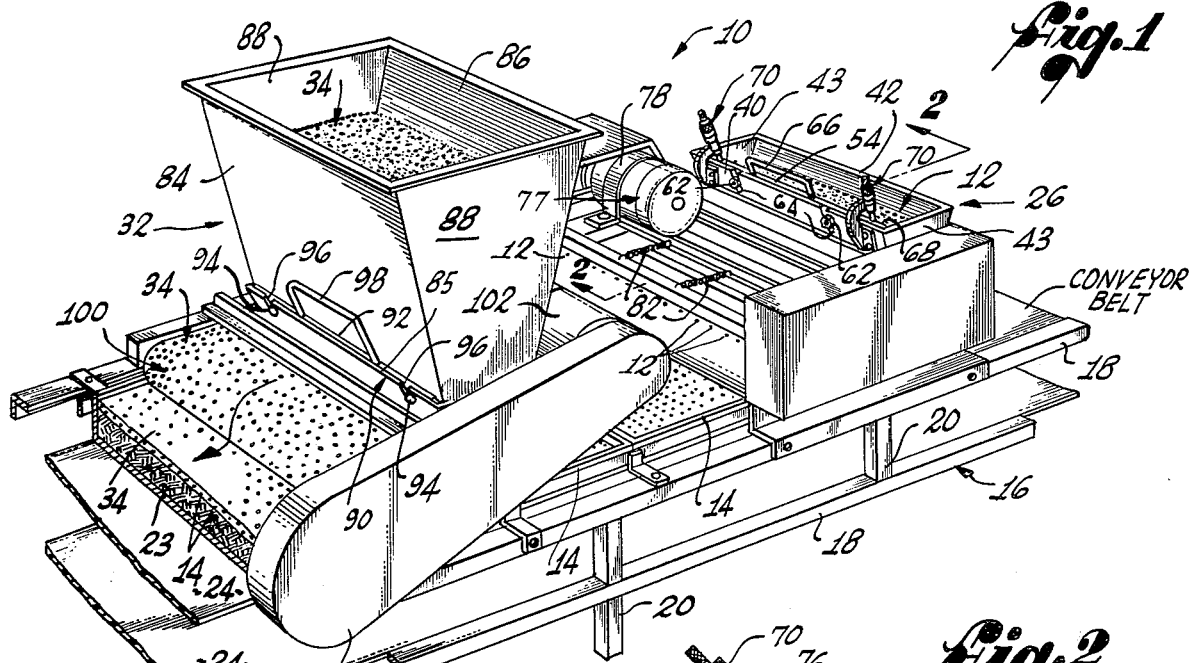
FIG. 1 is a fragmentary perspective view of an automatic seed planting machine in accordance with the invention, for planting seeds in flats moving on a conveyor below the machine, and employing the method of the invention.

Referring to the exemplary drawings, the present invention is embodied in an automatic seed planting machine 10 for distributing fruit or vegetable seeds 12 into shallow box planters 14, typically called "flats", and in a method for planting such flats. In this instance, the machine 10 is mounted above a metal frame 16 comprising rails 18 and posts 20, only a portion of the frame being shown in FIG. 1, and distributes seeds 12 into flats 14 which are moved under the machine by a delivery conveyor 22 supported to move between the rails of the frame.

Initally, the flats 14 are partially filled with soil 23 and then sequentially placed on the delivery conveyor 22, herein comprising an endless belt 24 having a width approximately equal to the width of a flat and driven by a suitable motor, preferably a variable speed motor, at a selected speed to move the flats from right to left in FIG. 1, under the machine 10. After the flats 14 have been planted by the machine 10, they typically are removed from the delivery conveyor 22 and placed in a greenhouse where the seeds germinate and grow.

In accordance with the invention, the seeds 12 are continuously and uniformly distributed into the moving flats 14 by initially dispensing seeds of predetermined thicknesses from a supply hopper 26 in a single uniform and closely spaced layer onto an upper supply conveyor 28, which delivers the seeds to a lower supply conveyor 30 moving at a speed greater than the speed of the upper conveyor, to spread the seeds apart while maintaining the uniformity of distribution. Seeds on the lower conveyor 30 are then dispensed into the flats 14, and the flats are then conveyed under a second hopper 32 from which a covering material 34 is dispensed over the seeds in the flats.

Figure 2:
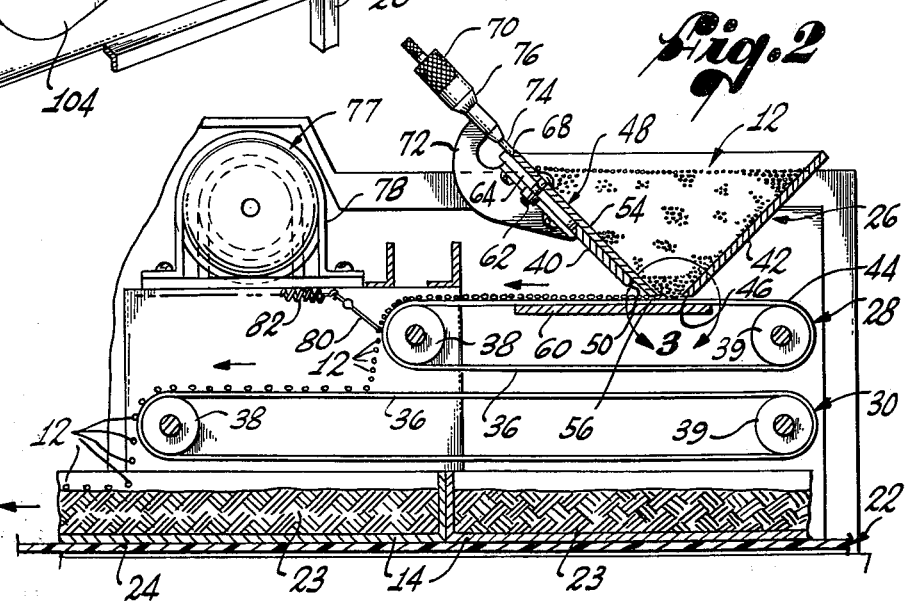
FIG. 2 is a fragmentary cross-sectional view of a portion of the machine, taken substantially along line 2—2 of FIG. 1.

As can best be seen in FIG. 2, the upper and lower conveyors 28 and 30 are endless conveyors, herein comprising rubber belts 36 of uniform thickness traveling one above the other in vertically spaced, horizontally disposed loops and moving in a counter-clockwise direction as viewed in FIG. 2 about pairs of vertically spaced forward and rear end rollers 38 and 39, respectively. The upper conveyor 28 has a width slightly less than the width of a flat 14, and terminates forwardly near the mid-point of the loop followed by the lower conveyor 30, the lower conveyor having a width substantially equal to that of the upper conveyor.

The supply hopper 26 comprises a trough extending laterally across a portion of the upper conveyor 28 and has a generally V-shaped vertical cross-section, as shown in FIG. 2, including inclined front and rear walls 40 and 42, respectively, closed at the ends by triangular shaped end walls 43. The top of the supply hopper 26 is open to allow seeds to be placed in the hopper and the front and rear walls 40 and 42 terminate above the outer surface 44 of the upper conveyor 28 which forms, in effect, a bottom for the supply hopper, the bottom edge 46 of the rear wall being disposed in close proximity to the upper conveyor.

To uniformly dispense seeds 12 from the supply hopper 26, an adjustable gate 48 is mounted on the front wall 40 and defines an escapement or dispensing opening 52 across the width of the upper conveyor 28 through which the seeds are dispensed in side-by-side relation. The gate 48 comprises a rectangular plate 54 slidably mounted on the inside surface of the front wall 40, and having a bottom edge 56 projecting below the bottom edge 50 of the front wall which has a bottom edge 50 located well above the outer surface 44 of the upper conveyor 28.

Figure 3:
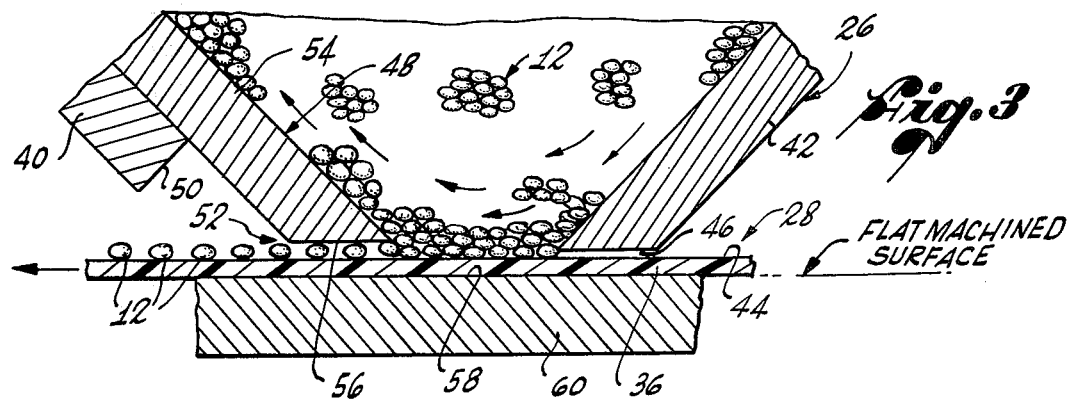
FIG. 3 is an enlarged fragmentary cross-sectional view taken substantially within the arc 3 of FIG. 2.

Referring primarily to the enlarged fragmentary cross-sectional view of FIG. 3, the bottom edge 56 of the gate 48 has a flat surface machined within relatively small tolerances, to be parallel with a flat upper surface 58 of a machined support plate 60 having a rectangular configuration. The support plate 60 is disposed horizontally and extends laterally across the width of the upper conveyor 28 which is supported by the plate as it travels forwardly past the supply hopper 26.

With very small seeds, such as celery seeds, unless precise control of the vertical height of the discharge opening 52 is available, it may be possible for several vertically stacked seeds to simultaneously pass through the opening. In order to achieve consistently uniform distribution of seeds in the flats 14, only one vertical layer of seeds can be allowed to pass through the discharge opening 52 at a time.

To control the size of the discharge opening 52, the gate 48 is mounted by bolts 62 projecting through elongated slots 64 formed through the front wall 40 and can be selectively adjusted to control the vertical spacing of the bottom edge 56 above the upper conveyor 28. The slots 64 allow the bolts 62 to be loosened and the gate 48 moved by sliding the bolts through the slots, an inverted U-shaped handle 66 projecting from the top edge 68 of the gate to facilitate movement of the gate. Once adjusted to the selected position, the bolts 62 can be tightened to hold the gate 48 in place.

To provide a visual indication of the height of the bottom edge 56 of the gate 48 above the outer surface 44 of the upper conveyor 28, two micrometers 70 are attached by upstanding brackets 72 to the front wall 40. Each micrometer 70 is positioned a small distance laterally from an end wall 43 with its spindle 74 projecting downwardly along the inner surface of the front wall 40 and the end abutting the top edge 68 of the gate 48.

Scales 76 on the micrometers 70 permit an operator of the machine 10 to quickly and easily set the size of the discharge opening 52 for the particular type of seeds 12 to be planted, the micrometer setting for each particular type of seed having been first determined through trial-and-error and then recorded for subsequent reference when that type seed is again to be planted. For example, with one particular machine when planting celery seeds, it was determined that a micrometer setting of twenty thousandths of an inch provided just the right size for the discharge opening to permit only one vertical layer of seeds to be discharged from the supply hopper 26. Thus, each time celery seeds are to be planted, the gate 48 of that machine can be quickly adjusted by setting each micrometer 70 to have a reading on the scale 76 of 0.020 inches.

Additionally, through proper selection of the size of the discharge opening 52, seeds which are wet can be prevented from being dispensed from the supply hopper 26. It is not unusual that the size of a seed may double or even triple if the seed is wet as compared to its size when dry, and if a wet seed is planted, it will, in all likelihood, not germinate and hence not produce a plant. Thus, it is undesirable to have wet seeds planted, and by selecting the discharge opening size to permit only the size of dry seeds to be discharged, wet seeds will not be planted.

As indicated by the arrows shown in FIG. 3, the forward motion of the upper conveyor 28 as it moves under the supply hopper 26 produces a circulation of seeds 12 in the supply hopper, herein a clockwise circulation as viewed in FIG. 3, with the seeds feeding downwardly along the rear wall 42, forwardly along the bottom portion of the supply hopper, and then either out the discharge opening 52 or upwardly along the front wall 40. Seeds, such as large, wet seeds, which cannot pass through the discharge opening 52, are forced by the circulation out of the area of the discharge opening 52 thereby to prevent blocking the opening. Further, since the front wall 40 of the supply hopper 26 is inclined, preferably at an angle of about 45°, seeds 12 which do not pass through the discharge opening 52 will ride smoothly up the front all and not be bruised or damaged. When the dispensing operation has been completed, the large wet seeds remaining in the supply hopper 26 can be removed and dried for subsequent planting.

Since a substantially continuous stream of seeds 12 is dispensed from the supply hopper 26, the seeds must be longitudinally spaced out before planting in the flats 14 to provide sufficient space for each seed to germinate and grow. To accomplish this result, the upper conveyor 28 moves at a much slower speed then the lower conveyor 30 onto which seeds from the upper conveyor are dropped. In this case, a single electric motor 77 secured by a bracket 78 to the machine 10, drives both the upper and lower conveyors 28 and 30, a suitable gear mechanism (not shown) being used to produce the different speed rates for each conveyor through the rollers 38 and 39, typically on the order of a ten to one speed ratio.

To insure that the seeds 12 on the upper conveyor 28 are dropped uniformly onto the lower conveyor 30, a brush 80 is dropped across the width of the upper conveyor and engages the outer surface 44 of the belt 36 during the vertical portion of its travel around the forward roller 38. The brush 80 herein is biased by a pair of springs 82 attached to the machine 10 and functions to wipe seeds off of the upper conveyor 28 so that all seeds fall onto the lower conveyor 30 from substantially the same longitudinal position with respect to the lower conveyor.

Seeds on the lower conveyor 30 drop into the flats 14 as they are moved under the forward end of the lower conveyor by the delivery conveyor 22. As shown herein, the speed of the lower conveyor 30 is substantially equal to the speed of the delivery conveyor 22, and thus the seed distribution in the flats 14 will closely approximate that on the lower conveyor and will be substantially uniform from flat to flat. Due to the relatively high speed of the lower conveyor 30 as compared to that of the upper conveyor 28, centrifugal force as the belt 36 moves around the forward roller 38 should be sufficient to cause the seeds 12 to fall off the lower conveyor uniformly, although in some cases it may be desirable to include a brush like that employed to wipe seeds off the upper conveyor.

After the seeds 12 have been dropped into the flats 14, each flat moves under the second hopper 32 where covering material 34 is applied over the seeds. In this instance, the covering material 34 is fine gravel, although any suitable covering such as peat, soil, sand, etc. can be used to cover the seeds. After application of the covering material 34, the flats 14 move out of the area of the machine 10 for removal to the growing area.

In order to insure that the seeds 12 are covered by a substantially uniform layer of gravel 34, the second hopper 32, which herein is similar in construction to the supply hopper 26 but larger in size and includes front and rear walls 84 and 86, and side walls 88, has an adjustable gate 90 attached to the outside of the front wall 84. This gate 90 is also similar in structure to that employed on the supply hopper 26 and comprises a rectangular plate 92 movably secured to a plate 85 outstanding from the front wall 84 by volts 94 which extend through slots 96, and has an upstanding handle 98 to facilitate adjustment of the gate relative to the front wall. In most cases, it is not necessary that precise control of the height of the gate 90 on the second hopper 32 be available since all that is needed for seed coverage is a generally uniform discharge of material with a thickness sufficient to fully cover the seeds in the flats 14. Thus, the height of the gate 90 can be selected from within relatively wide ranges and no micrometers should be required.

Further, once the gate 90 of the second hopper 32 has been set, the gravel 34 can be discharged directly into the flats 14. To accomplish this result, only one conveyor 100, preferably an endless conveyor moving in a horizontal loop, conveys the gravel 34 from the second hopper 32 and drops the gravel into the flats 14 moving therebelow. Herein, the single conveyor 100 is operated by a separate electric motor 102 which has a chain drive (not shown) inside a protective cover 104 to move this conveyor at a selected speed, typically approximately equal to that of the lower conveyor 30.

Although trial-and-error may initially be necessary to determine the proper height for the gate of the supply hopper for each particular type of seed, it should be apparent that once the proper height has been found, each time the type of seed being planted is changed, the precise gate setting can be very quickly made through use of the micrometers. Once set, the gate will insure that a consistent and uniform distribution of seeds will be planted in each and every flat.

By way of example, when planting square flats having sides of about eighteen inches long with celery seeds, it is desirable that about 3500 to 600 seeds be planted in each flat. As previously mentioned, with one machine, a micrometer setting of twenty thousandths has been found to produce the desired result, and with such a machine, it has been found to be possible to plant 250 flats per day with each flat having a uniform and consistent seed distribution of 3500 to 3600 seeds.

Although regulation of the seed distribution per flat can easily be governed by the selection of the gate setting, it is also desirable that the speed of the delivery conveyor be variable through its drive motor. By keeping the gate setting constant, and varying the speed of the delivery conveyor, the maximum size seeds allowed to be discharged from the suppy hopper can be fixed, and the number of seeds planted in each flat can be controlled. For example, if the number of seeds per flat is to be reduced, this can be readily achieved by increasing the speed of the delivery conveyor thereby moving the flats past the end of the lower conveyor more rapidly.

From the foregoing, it should be apparent that the present invention provides a method of planting seeds in continuously moving flats, and an automatic machine for practicing the method, which will insure a uniform and consistent seed distribution in each and every planted flat. While a particular form of the invention has been described and illustrated, it also should be apparent that various modifications and variations therein can be made without departing from the spirit and scope of the invention.

I claim:

1. The method of planting seeds of a predetermined size uniformly in flats comprising the steps of:
   dispensing seeds from a supply in a hopper in single height, side-by-side, and closely spaced relation onto a first conveyor;
   dropping said seeds from said first conveyor to a second conveyor positioned therebelow;
   moving said second conveyor at a speed faster than that of said first conveyor thereby to space out said seeds dropped onto said second conveyor; and
   dropping said seeds from the end of said second conveyor into flats moving on a third conveyor below said second conveyor.

2. The method of planting seeds of a predetermined size in flats, comprising the steps of:
   dispensing seeds from a supply in a hopper in single-height, side-by-side, and closely spaced relation onto a first conveyor;
   dropping said seeds from said first conveyor to a second conveyor positioned therebelow;
   moving said second conveyor at a speed faster than that of said first conveyor thereby to space out said seeds dropped onto said second conveyor;
   dropping said seeds from the end of said second conveyor into flats moving on a third conveyor below said second conveyor; and
   dispensing a covering material into said flats after said seeds have been dropped from said second conveyor into said flats.

3. The method of planting seeds of a predetermined size uniformly into flats comprising the steps of:
   filling a hopper with a supply of seeds;
   dispensing seeds from said hopper in single-height, side-by-side, and closely spaced relation onto a first conveyor;
   dropping said seeds from said first conveyor to a second conveyor position therebelow;
   moving said second conveyor at a speed faster than that of said first conveyor thereby to space out said seeds dropped onto said second conveyor;
   dropping said seeds from the end of said second conveyor into flats moving on a third conveyor below said second conveyor; and
   dispensing a uniform layer of covering material into said flats after said seeds have been dropped from said second conveyor into said flat.

* * * * *

UNITED STATES PATENT AND TRADEMARK OFFICE
CERTIFICATE OF CORRECTION

PATENT NO. : 4,010,778
DATED : March 8, 1977
INVENTOR(S) : Alvin F. Aggen

It is certified that error appears in the above-identified patent and that said Letters Patent are hereby corrected as shown below:

Column 4, line 20, "all" should be --wall--;

line 41, "dropped" should be --disposed--.

Column 5, line 14, "volts" should be --bolts--;

line 47, "600" should be --3600--.

Signed and Sealed this

Thirty-first Day of May 1977

[SEAL]

Attest:

RUTH C. MASON
*Attesting Officer*

C. MARSHALL DANN
*Commissioner of Patents and Trademarks*